(12) United States Patent
Baillargeon

(10) Patent No.: US 9,414,255 B2
(45) Date of Patent: Aug. 9, 2016

(54) PACKET FLOW CONTROL IN A WIRELESS COMMUNICATIONS NETWORK BASED ON AN INDICATION CONTAINED IN A PACKET

(75) Inventor: Steve Baillargeon, Gatineau (CA)

(73) Assignee: Alcatel Lucent, Boulogne-Billancourt (FR)

(*) Notice: Subject to any disclaimer, the term of this patent is extended or adjusted under 35 U.S.C. 154(b) by 1357 days.

(21) Appl. No.: 10/261,054

(22) Filed: Sep. 30, 2002

(65) Prior Publication Data

US 2004/0052212 A1 Mar. 18, 2004

Related U.S. Application Data

(60) Provisional application No. 60/410,484, filed on Sep. 13, 2002.

(51) Int. Cl.
| | | |
|---|---|---|
| *H04W 28/02* | (2009.01) | |
| *H04L 1/00* | (2006.01) | |
| *H04L 12/801* | (2013.01) | |
| *H04L 12/815* | (2013.01) | |
| *H04L 12/825* | (2013.01) | |
| *H04W 28/14* | (2009.01) | |
| *H04W 80/00* | (2009.01) | |

(52) U.S. Cl.
CPC .............. *H04W 28/02* (2013.01); *H04L 1/0002* (2013.01); *H04L 1/0026* (2013.01); *H04L 47/10* (2013.01); *H04L 47/11* (2013.01); *H04L 47/12* (2013.01); *H04L 47/22* (2013.01); *H04L 47/266* (2013.01); *H04L 1/0017* (2013.01); *H04W 28/14* (2013.01); *H04W 80/00* (2013.01)

(58) Field of Classification Search
USPC .................................................. 370/230–238
See application file for complete search history.

(56) References Cited

U.S. PATENT DOCUMENTS

| | | | | |
|---|---|---|---|---|
| 6,215,772 B1* | 4/2001 | Verma | ............................ | 370/236 |
| 6,501,732 B1* | 12/2002 | Xu et al. | .......................... | 370/235 |
| 6,515,972 B1* | 2/2003 | Gage et al. | ...................... | 370/328 |
| 6,665,291 B1* | 12/2003 | Shahdad et al. | ............... | 370/352 |
| 6,683,853 B1* | 1/2004 | Kannas et al. | ................. | 370/237 |
| 6,791,941 B1* | 9/2004 | Dziong et al. | ................. | 370/229 |
| 6,865,185 B1* | 3/2005 | Patel et al. | ...................... | 370/412 |
| 6,982,957 B2* | 1/2006 | Kiiski et al. | ................... | 370/235 |
| 7,092,357 B1* | 8/2006 | Ye | .................................. | 370/230 |
| 7,283,474 B1* | 10/2007 | Bergenwall | .................... | 370/235 |
| 7,474,616 B2* | 1/2009 | Connor | ........................ | 370/230.1 |
| 7,792,078 B2* | 9/2010 | Haumont | ................ | H04W 8/12 370/331 |

(Continued)

OTHER PUBLICATIONS

3rd Generation Partnership Project 2, "3GPP2", "Interoperability Specification (IOS) for CDMA 2000 Access Network Interfaces—Part 1 Overview," Version 1.0, pp. 1-19, dated Nov. 16, 2001.

(Continued)

*Primary Examiner* — Marcus R Smith
(74) *Attorney, Agent, or Firm* — Chiesa Shahinian & Giantomasi, PC

(57) ABSTRACT

A wireless communications network comprises a wireless network controller coupled to a packet gateway. An indication of congestion of network resources is communicated between the wireless network controller and the packet gateway. In response to the indication of congestion of network resources, one of the wireless network controller and packet gateways adjusts packet data flow between the wireless network controller and the packet gateway.

33 Claims, 4 Drawing Sheets

(56) References Cited

U.S. PATENT DOCUMENTS

| | | | |
|---|---|---|---|
| 2003/0112754 A1* | 6/2003 | Ramani et al. | 370/230 |
| 2004/0008628 A1* | 1/2004 | Banerjee | 370/236.1 |
| 2004/0014491 A1* | 1/2004 | Weigand | 455/552.1 |
| 2004/0071086 A1* | 4/2004 | Haumont et al. | 370/230 |

OTHER PUBLICATIONS

Fei Peng and Jian Ma, "An Effective Way for Enhancement of TCP Performance in Wireless and Mobile Networks," pp. 1-12, dated Aug. 1999.

Fei Peng and Jian Ma, "A Proposal to Add Fast Congestion Notification to IP and Improve TCP Performance in Wireless and Mobile Networks," pp. 1-9, dated Jul. 2000.

Fei Peng and Jian Ma, A Proposal to Apply ECN into Wireless and Mobile Networks, pp. 1-9, dated Jan. 2001.

$3^{rd}$ Generation Partnership Project 2, "3GPP2", "Interoperability Specification (IOS) for CDMA 2000 Access Network Interfaces—Part 1 Overview," Version 2.0, pp. 1-17, dated May 2002.

$3^{rd}$ Generation Partnership Project, "Technical Specification Group Services and System Aspects, Support of Push Service (Release 5)," pp. 1-70, dated 2002.

* cited by examiner

PACKET FLOW CONTROL IN A WIRELESS COMMUNICATIONS NETWORK BASED ON AN INDICATION CONTAINED IN A PACKET

CROSS REFERENCE TO RELATED APPLICATION

This claims the benefit under 35 U.S.C. §119(e) to U.S. Provisional Application Ser. No. 60/410,484, entitled "PDSN Resource State Protocol," filed Sep. 13, 2002.

TECHNICAL FIELD

The invention relates to packet flow control in a wireless communications network.

BACKGROUND

Generally, mobile or wireless communications networks are made up of a plurality of cells. Each cell provides a radio communications center through which a mobile station establishes a call or other communications session with another mobile station or a terminal connected to either a circuit-switched network (e.g., public-switched telephone network or PSTN) or a packet-switched data network. Typically, each cell includes a radio base station, with each base station coupled to a switching center or controller that controls processing of calls or other communications sessions between or among mobile stations or between mobile stations and terminals connected to a circuit-switched or a packet-switched network.

Various wireless protocols exist for defining communications in a wireless network. One type of protocol is based on the time-division multiple access (TDMA) technology, such as the TIA/EIA-136 standard or the Global System for Mobile (GSM) standard. Another type of protocol for wireless communications is based on the code-division multiple access (CDMA) technology. CDMA is a spread spectrum wireless communications protocol in which transmission is based on the spread spectrum modulation technique to allow many users to have access to the same band of carriers.

Traditionally, wireless networks were designed for carrying circuit-switched voice traffic. However, with the wide availability of the Internet and intranets, packet-switched communications (e.g., web browsing, electronic mail, instant messaging, electronic gaming, and so forth) have become common. As a result, third generation (3G) and beyond wireless technologies are being developed and implemented to provide higher bandwidth and more efficient packet-switched communications (of data as well as voice and other forms of real-time data) over wireless networks.

Packet-switched wireless communications protocols have been developed for a variety of wireless protocols, including both TDMA and CDMA. For example, in the CDMA context, a CDMA 2000 family of standards has been developed that is capable of supporting both traditional circuit-switched traffic as well as packet-switched traffic. On the TDMA side, 3GPP (Third Generation Partnership Project) UMTS (Universal Mobile Telecommunication System) standards have been adopted or are being developed. UMTS is based on the wideband code-division multiple access (W-CDMA) technology. Also, for TDMA, versions of the Enhanced Data Rate for Global Evolution (EDGE) technology are also being developed.

A wireless communications network that is capable of supporting packet services, such as voice-over-Internet Protocol (IP), electronic mail, web browsing, and so forth, includes various components that enable a mobile station to communicate wirelessly over radio frequency (RF) signaling with a packet-switched network, such as the Internet or various private intranets. Potentially, there can be a large volume of traffic that is communicated between a wireless network and the packet-switched network. As a result, resources of the wireless communications network can become highly loaded. In such conditions, the quality of communications can deteriorate, such as by packets being lost or calls being dropped.

SUMMARY

In general, an improved mechanism is provided to manage communications in a wireless communications network under various conditions, including light traffic conditions as well as heavy traffic conditions. For example, a method of managing wireless communications includes communicating, between a wireless network controller and the packet gateway, an indication of congestion of network resources. The communication of data between the wireless network controller and the packet gateway is adjusted based on the communicated indication.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
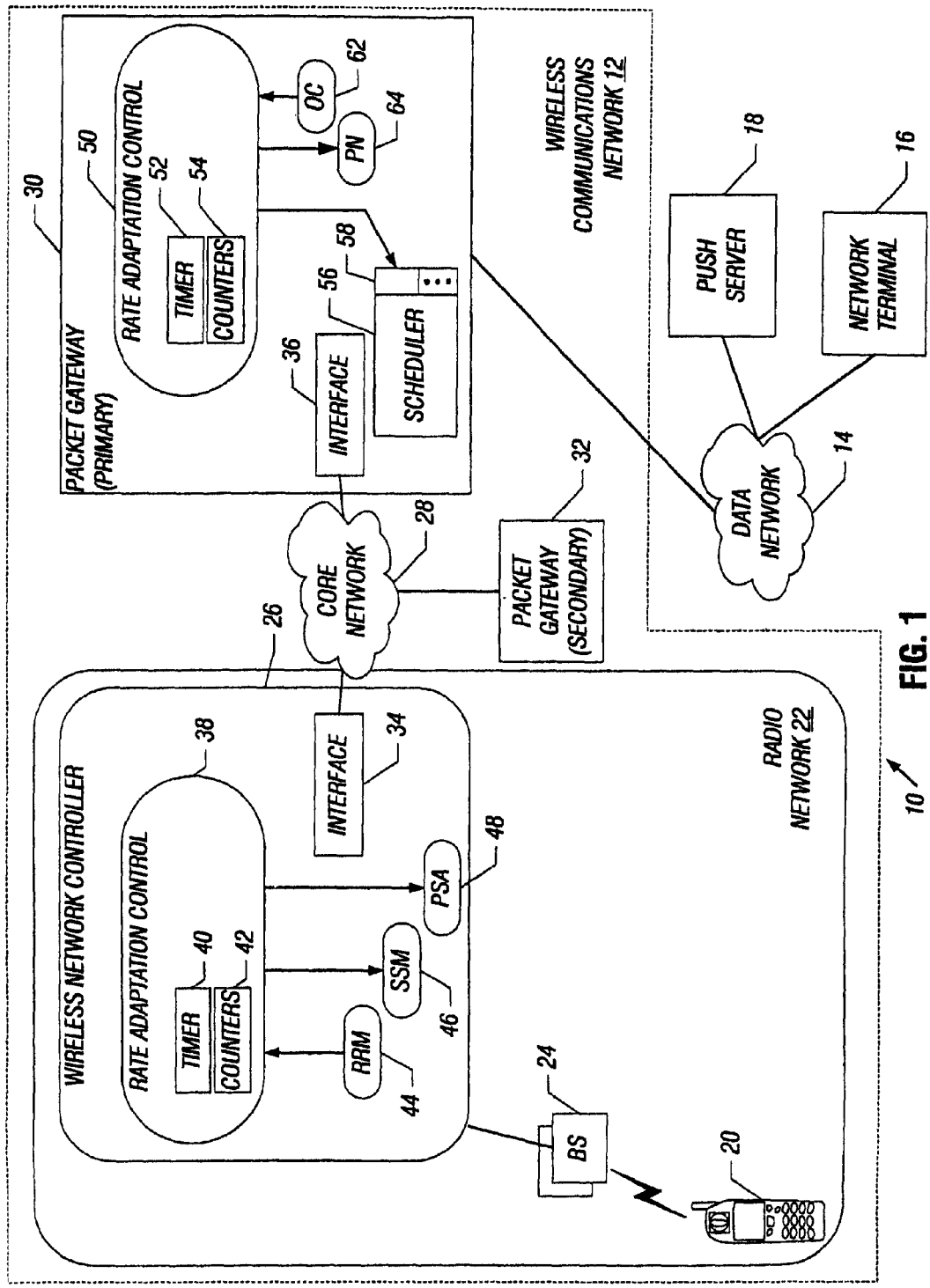
FIG. 1 is a block diagram of an arrangement of a wireless communications network that is coupled to a packet-switched data network.

Referring to FIG. 1, a communications network 10 includes a wireless communications network 12 that is coupled to a packet-switched data network 14. Examples of the packet-switched data network 14 include the Internet as well as intranets. Various components can be coupled to the packet-switched data network 14, such as one or more network terminals 16 as well as a push server 18 for delivering "push content" to a mobile station 20 in a radio network 22. The radio network 22 is part of the wireless communications network 12.

Push content service involves the delivery of information to a mobile subscriber at the initiation of a network application server. The push service can include the communication of push content such as advertising information, local news, service updates, and so forth. Some of this information may be considered delay-sensitive and should be transmitted as quickly as possible. Such push content is referred to as "real-time" or "premium" push content. Examples include stock news, sports tickers, location services, and so forth. Another type of push content is not delay-sensitive and can be delivered during non-busy hours. Such push content is referred to as "best effort" push content.

The mobile station 20 communicates over wireless links (e.g., radio frequency or RF links) with a base station 24 that is located in a cell (or cell sector) of the radio network 22. Each cell or cell sector is associated with a base station 24. Typically, the radio network 22 includes a large number of cells or cell sectors associated with respective base stations. Each base station 24 is in turn coupled to a wireless network controller 26. There are usually multiple wireless network controllers 26 in the radio network 22, with each wireless network controller 26 associated with a group of base stations 24.

In the UMTS context, the wireless network controller is referred to as a radio network controller (RNC). In the CDMA context, the wireless network controller is referred to as a base station controller (BSC). Although reference is made to UMTS or CDMA, it is contemplated that other types of wireless protocols are used in other embodiments. More generally, a "wireless network controller" refers to any controller that manages communications between base stations and other nodes in a wireless communications network.

The wireless network controller 26 is in turn coupled through a core network 28 to a packet gateway 30. In the UMTS context, the packet gateway 30 is a gateway GPRS (General Packet Radio Service) serving node (GGSN). In the CDMA context, the packet gateway 30 is a packet data serving node (PDSN). Furthermore, in other embodiments, the packet gateway 30 can be any other type of system that provides an interface between the wireless communications network 12 and the packet-switched data network 14.

The packet gateway 30 is identified as the primary packet gateway for the wireless network controller 26. In case of congestion or failure of the primary packet gateway 30, the wireless network controller 26 is further associated with a backup or secondary packet gateway 32.

The mobile stations 20 are capable of performing packet-switched communications through the wireless communications network 12 with other mobile stations, as wells as with devices coupled to the data network 14. Examples of packet-switched communications include web browsing, electronic mail, file transfer, text chat, packet-switched voice calls, and so forth. One type of packet-switched voice traffic is voice-over-Internet Protocol (voice-over-IP) traffic. One version of IP is IPv4, which is described in Request for Comments (RFC) 791, entitled "Internet Protocol," dated September 1981. Another version of IP is IPv6, which is described in RFC 2460 "Internet Protocol, Version 6 (IPv6) Specification," dated December 1998. The teachings of the present invention are applicable to each of the foregoing packet-switched protocols.

Although not shown, the core network 28 includes intermediate routers and other nodes (e.g., switches) between the wireless network controller 26 and the packet gateway 30. For example, in the UMTS context, a serving GPRS support node (SGSN) is provided between the wireless network controller 26 and the GGSN. In the CDMA context, a packet control function (PCF) module is provided between the wireless network controller 26 and the PDSN. PCF module(s) are usually implemented in the wireless network controller.

In the wireless communications network 12 shown in FIG. 1, an appropriate tunneling protocol is employed for establishing a core network bearer between the wireless network controller 26 and the packet gateway 30 or 32. This tunneling protocol is defined over a UDP/IP (User Datagram Protocol/Internet Protocol) stack. In the UMTS context, the tunneling protocol is the GPRS Tunneling Protocol (GTP), as defined by. In the CDMA context, the tunneling protocol is the GRE (Generic Routing Encapsulation) protocol.

Each of the wireless network controller 36 and packet gateway 30 includes an interface 34 and 36, respectively, that defines the signaling protocols and encapsulating methods between the wireless network controller 26 and the packet gateway 30 or 32. For example, each of the interfaces 34 and 36 includes a physical layer, a data link layer, a UDP/IP stack, and a layer for defining the tunneling protocol between the wireless network controller 26 and the packet gateway 30 or 32. Other layers are also defined in each of the interfaces 34 and 36.

In accordance with some embodiments of the invention, one of the features of each of the wireless network controller 26 and the packet gateway 30 is the ability to perform adaptation of communications between the wireless network controller 26 and packet gateway 30 in response to detection of congestion of network resources. Congestion of network resources includes either congestion of resources in the radio network 22, or congestion of resources in the packet gateway 30. For example, if there are many established call or other communication sessions in a given cell or cell sector of the radio network 22, then the cell or cell sector may be considered moderately or heavily loaded, which may lead to deterioration of radio signals. In such conditions of moderate or heavy loading, the cell or cell sector in the radio network 22 is considered to be experiencing congestion of network resources.

In another scenario, due to large volumes of call setups in a relatively short period of time, the packet gateway 30 may become overloaded. In this other scenario, the packet gateway 30 is said to be experiencing congestion of network resources within the packet gateway 30. Network resources of the packet gateway 30 includes its CPU(s), input/output (I/O) devices, and other hardware or software components.

In response to network resource congestion conditions, the communications of packet data flow between the wireless network controller 26 and packet gateway 30 is adjusted. "Adjusting the packet data flow" includes one or more of the following: varying a rate at which data packets are transmitted and/or scheduled; varying an amount of data packets that are communicated; and selecting an alternative packet gateway over which calls are established. More generally, adjusting the packet data flow refers to any change in the manner in which data is communicated between the wireless network controller 26 and the packet gateway 30.

A congestion condition is indicated by sending an indication contained in packets that are communicated in an established communication session. For example, the indication is contained in a header of a packet, which has a payload section that includes either bearer traffic (e.g., user data, application data, etc.) or control information.

In one example application, the wireless network controller 26 sends an indication to the packet gateway 30 when the wireless network controller 26 detects that a congestion condition exists in the radio network 22. Congestion is caused by moderate or heavy loading of resources of a cell or cell sector. The term "heavy" or "moderate" refers to a condition or utilization of one or more resources that exceeds certain predefined thresholds. Such predefined thresholds are dependent upon the design of the radio network 22 or the packet gateway 30, or other components in a communications path.

In response to the indication from the wireless network controller 26 of the congestion condition in the radio network 22, the packet gateway 30 adjusts or adapts the packet data flow in the downstream direction from the packet gateway 30 to the wireless network controller 26. For example, the packet data flow is adjusted by changing a scheduling rate at which a scheduler 56 in the packet gateway 30 schedules data in queues 58 of the packet gateway 30.

Typically, different packet-switched communications sessions have different priorities according to a quality of service (QoS) level assigned to the session. For example, voice or other real-time communications generally have higher priority than other forms of communications, such as electronic mail or web browsing. To ensure that the higher priority sessions are not adversely affected by the reduction of the scheduling rate during congestion conditions, the packet gateway 30 gives priority to packets associated with higher priority sessions when deciding which data to schedule for communication from the packet gateway 30 to the wireless network controller 26. Optionally, and depending upon the features and capabilities of a communications network, a subscriber to the foregoing communications services may be offered the opportunity to elect enhanced qualities of service for certain types of communication, thereby allowing for a prioritization scheme that differs from that mentioned above.

In another example application, the push server 18 delivers push content to a mobile station 20 in the radio network 22 when the radio network 22 is not experiencing a congestion condition. During periods of congestion conditions in the radio network 22, the push server 18 is notified by the packet gateway 30 to not communicate push content to the mobile station 20. Alternatively, the push content can be classified into two different categories: a "best-effort" category and a premium category. In this alternative implementation, the best-effort data is not communicated by the push server 18 during periods of heavy congestion, while the premium data is delivered during such periods.

In a third application, the packet gateway 30 sends indications of congestion conditions to the wireless network controller 26 in response to the packet gateway 30 experiencing congestion of resources within the packet gateway 30. In response to receiving the indication of congestion from the packet gateway 30, the wireless network controller 26 either reduces an effective connection establishment rate or selects an alternate or backup packet gateway 32 through which communications sessions are established. In one embodiment, this application is used in a CDMA 2000 network. However, in other embodiments, other types of networks can use this third application.

In any given communications network, one or more of the three applications referenced above can be implemented.

In addition to the interface 34, the wireless network controller 26 also includes a rate adaptation control module 38 that is used for adjusting the packet data flow during congestion conditions. The rate adaptation control module 38 includes a timer 40 as well as one or more counters 42 (discussed further below). Also, the wireless network controller 26 includes a radio resource management (RRM) module 44, which is responsible for monitoring and determining radio traffic conditions in the radio network 22. The wireless network controller 26 also includes a signaling state machine (SSM) module 46 for communicating signaling between the wireless network controller 26 and other entities in the radio network 22 for call setup or setup of other communications sessions. In addition, the wireless network controller 26 includes a packet gateway selection module 48 that is responsible for selecting an alternative or backup packet gateway in case the primary packet gateway becomes unavailable. Selection of an alternative or backup gateway is based on some predefined packet gateway selection algorithm.

The packet gateway 30 also includes a rate adaptation control module 50 that is associated with a timer 52 and one or more counters 54. In addition, the packet gateway 30 includes multiple connection schedulers 56 (one per connection/tunnel) and a set of one or more queues 58 associated with each scheduler 56. Each scheduler 56 schedules packets in the queues 58 for communication over the core network 28 to the wireless network controller 26. The multiple queues 58 can be designed to buffer packets having different QoS requirements. For example, a first queue stores voice-over-IP data, a second queue stores best-effort data (e.g., e-mail, web browsing, etc.), and so forth.

Each connection scheduler 56 also has traffic management functions for managing traffic. In addition, the packet gateway 30 includes an overload control (OC) module 62 that is responsible for detecting overload conditions of the packet gateway 30 and for notifying the wireless network controller 26 of such overload or congestion conditions. Further, the packet gateway 30 includes a presence notification (PN) module 64 for notifying a push server when a subscriber (mobile station) can receive push content.

In accordance with one embodiment of the invention, each of the wireless network controller 26 and packet gateway 30 communicates an indication of a congestion condition by providing Explicit Congestion Notification (ECN) in encapsulated user data packets traveling in the opposite direction of the congestion. In one example implementation, ECN is controlled by two bits that are part of the IP header of an IPv4 or IPv6 packet. ECN bits are set to different values depending upon the level of congestion. For example, if a network is not experiencing any congestion or is lightly utilized, ECN is set to a first value (referred to as a "green" value, with ECN="01" codepoint, in one example). If the network is experiencing a moderate level of congestion, then ECN is set to a second value (referred to as a "yellow" value, with ECN="10" codepoint, in one example). If the network is experiencing a heavy congestion condition, then the ECN is set to a third value (referred to as a "red" value, with ECN="11" codepoint, in one example).

Figure 2:
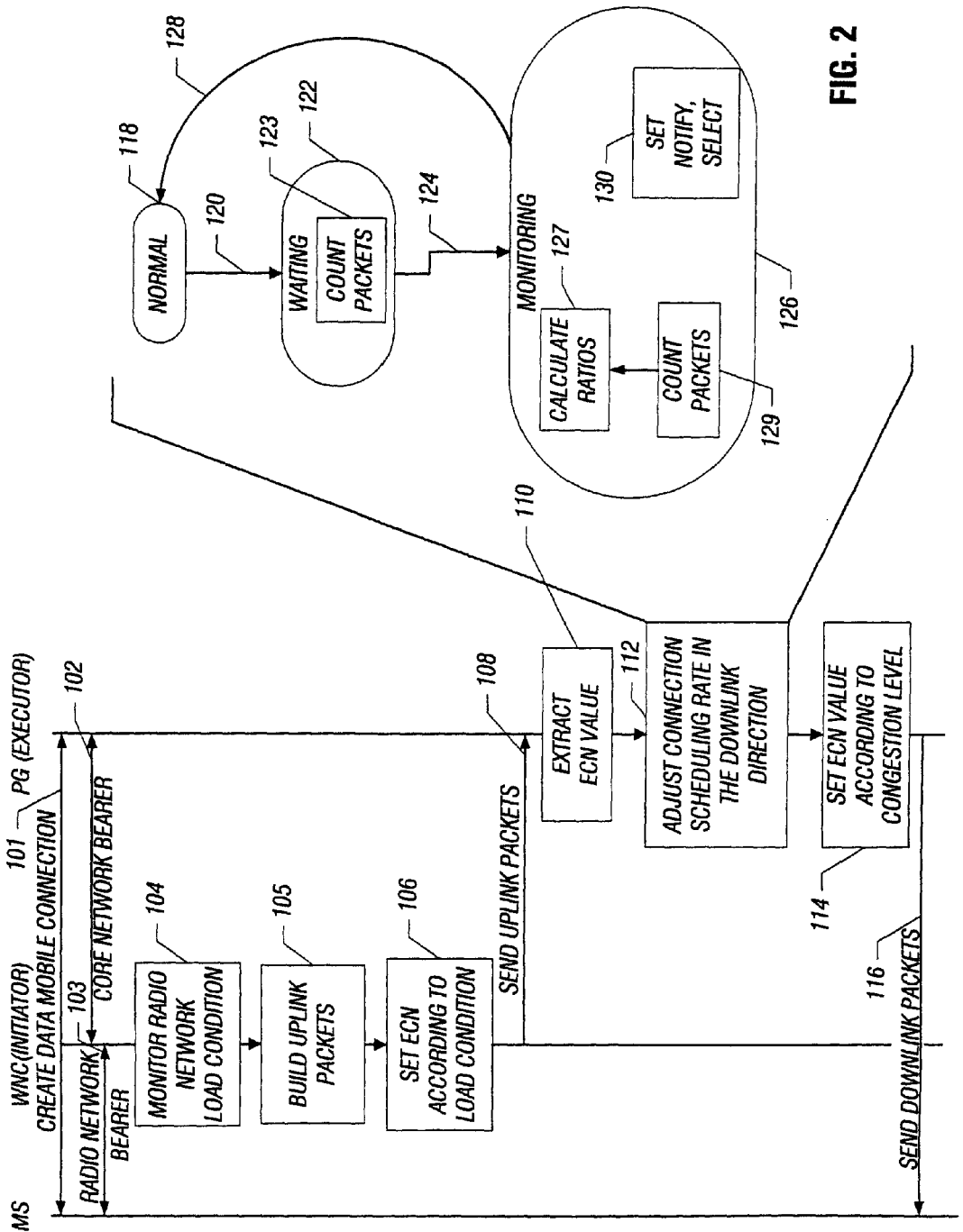
FIG. 2 is a message flow diagram and a data transfer (user plane) procedure according to one embodiment of a process for handling packet flow in response to load conditions in a radio network.

FIG. 2 shows a message flow diagram between the wireless network controller 26 and the packet gateway 30 for performing the handling of a congestion conditions in the radio network 22. In the application of FIG. 2, the rate adaptation control module 38 in the wireless network controller 26 is referred to as the rate adaptation control initiator (or more simply "initiator"), and the rate adaptation control module 50 in the packet gateway 30 is referred to as the rate adaptation control executor (or more simply "executor").

A data mobile connection is established (at 101) between the mobile station and the packet gateway 30. One of the acts performed in establishing the data mobile connection is the activation of a primary Packet Data Protocol (PDP) context, which includes, among other things, the requested default quality of service (QoS) profile for a requested connection. In the establishment of the data mobile connection between the mobile station and the packet gateway, a radio bearer path 103 and core network bearer path 102 are established. In addition, each of the wireless network controller 26 and packet gateway 30 invokes the rate adaptation control module (38 or 50) for adapting (if necessary) packet data flow over a given tunnel (associated with a given mobile station 20) between the wireless network controller 26 and the packet gateway 30.

The rate adaptation control initiator 38 in the wireless network controller 26 monitors (at 104) radio network 22 load conditions and gets the ECN bits accordingly. This is performed by sending a request to the RRM 44 to determine the radio traffic condition, with the RRM sending back an indication of the resource usage in the radio network. Alternatively, instead of the initiator 38 sending a query to the RRM 44, the RRM 44 can periodically send status reports to the rate adaptation control initiator 38. In either case, some indication is received by the initiator 38 from the RRM 44 of the radio network load condition. In alternative embodiments, other mechanisms for notifying the initiator 38 of the radio network load condition can be employed.

Next, the rate adaptation control initiator 38 builds (at 105) uplink packets, which are packets sent from the wireless network controller 26 to the packet gateway 30 in response to receiving user data packets from the mobile station 20 or control packets from the wireless network controller for maintenance of the core network bearer. The packets being built are IP packets. The ECN bits in the IP header of the IP packets are set (at 106) to indicate the load condition of the radio network 22. As noted above, the ECN bits contain different values depending upon the load conditions of the radio network 22. If lightly loaded, ECN is set to the green value. If the radio network 22 is moderately or heavily loaded, ECN is set to the yellow or red value, respectively.

In alternative embodiments, instead of building an IP packet, the wireless network controller 26 forwards IP packets received from the mobile station to the packet gateway 30, with the wireless network controller 26 setting the ECN value based on radio network local conditions.

According to one embodiment, it is assumed that routers and switches in the core network 28 do not change ECN bit settings and only forward/switch IP packets transparently.

The uplink IP packets are sent (at 108) over the core network 28 to the packet gateway 30. As discussed above, a tunneling protocol is used to tunnel packets from the wireless network controller 26 to the packet gateway 30. Alternatively, a tunneling technique is not employed for communications between the wireless network controller 26 and the packet gateway 30.

At the receiving end, the rate adaptation control executor 50 extracts (at 110) the ECN value from the IP header. The executor 50 checks the value of the ECN bits to determine if the load condition of the radio network 22 is a lightly loaded condition (referred to as a "green" condition). If so, the packet gateway 30 sends downlink packets with ECN set to indicate that the packet gateway 30 is ECN-capable. This indicates to the wireless network controller 26 that the packet gateway 30 is capable of adjusting or changing its behavior based on indications of load condition in the radio network 22.

If the executor 50 determines that the ECN value indicates that the radio network 22 is experiencing either a moderately loaded condition (referred to as a "yellow" condition) or a heavily loaded condition (referred to as a "red" condition), the executor 50 adjusts (at 112) the connection scheduling rate for the downlink packets associated with the mobile station attached to a congested cell. Yellow or red conditions are conditions in which congestion of network resources in the radio network 22 is being experienced.

The adjusting of scheduling is performed according to the logic represented as 118-130 shown in FIG. 2. This logic is referred to as the rate adaptation logic. The rate adaptation logic includes a state machine represented by the "normal," "waiting," and "monitoring" states 118, 122, and 126, respectively. The rate adaptation control state machine in the executor 50 transitions between the normal, waiting, and monitoring states depending upon the indicated load condition of the radio network 22 for a given mobile station 20. The adjustment of downlink (packet gateway 30 to wireless network controller 26) packet data flow is performed on a per-mobile station basis.

The rate adaptation logic starts in the normal state 118, which is the state that the state machine is in when the radio network 22 is experiencing no or light loading (the green condition). However, if the rate adaptation logic receives a predetermined number of consecutive packets with ECN set to values indicating either the yellow condition or red condition, the rate adaptation logic transitions (at 120) from the normal state 118 to the waiting state 122. In one embodiment, the predetermined number of consecutive packets is two consecutive packets. However, in other embodiments, other numbers of packets can be specified for causing the state machine to transition from the normal state 118 to the waiting state 122.

To avoid a situation in which the rate adaptation control executor 50 reacts immediately to packets that contain ECN bits indicating yellow and red conditions, the rate adaptation logic stays in the waiting state 122 until some predetermined period of time has expired. This is indicated by the timer 52 (FIG. 1) counting a predefined period of time. The amount of time specified by the timer 52 is determined by some parameter or algorithm. For example, the amount of time counted by timer can be set according to a rate adaptation sensitivity parameter. In one embodiment, to achieve fairness among a group of subscribers, the rate adaptation sensitivity parameter is set to the same value for all the subscribers of the group.

Table 1 below shows an example of how values of the rate adaptation sensitivity parameter corresponds to a waiting interval counted by the timer 52. For example, if the rate adaptation sensitivity parameter has the value 20, then the waiting interval is 40 milliseconds. If the rate adaptation sensitivity parameter has the value 19, then the waiting interval is 80 milliseconds. Other values of the rate adaptation sensitivity parameter are associated with other waiting intervals, as shown in Table 1. Note that Table 1 is provided for the purpose of illustration only, and is not intended to limit the scope of the invention.

TABLE 1

| Rate Adaptation Sensitivity | Waiting Interval (msec) |
|---|---|
| 20 | 40 |
| 19 | 80 |
| 18 | 120 |
| 17 | 160 |
| 16 | 200 |
| 15 | 300 |
| 14 | 440 |
| 13 | 600 |
| 12 | 900 |
| 11 | 1200 |
| 10 | 1800 |
| 9 | 2500 |
| 8 | 3500 |
| 7 | 5000 |
| 6 | 7000 |
| 5 | 10000 |
| 4 | 14000 |
| 3 | 20000 |
| 2 | 28000 |
| 1 | 40000 |

In the waiting state 122, the rate control adaptation executor 50 counts (at 123) the total number of "ingress" packets (packets from the wireless network controller 26 for a given mobile station, a number of packets with ECN set to the yellow value, and a number of packets with ECN set to the red value). Counting such packets enables the implementation of a "ratio rule" to determine the congestion level and to adjust packet data flow from the packet gateway 30 to the wireless network control 26 for a given mobile station. The counting is performed using the counters 54 (FIG. 1). In one embodiment, the adjustment of packet data flow is performed by adjusting the shaping or scheduling rate.

After expiration of the predetermined interval set by the rate adaptation sensitivity parameter, the rate adaptation logic transitions (at 124) from the waiting state 122 to the monitoring state 126. In the monitoring state 126, the executor 50 uses the ratio rule to determine how the packet data flow is to be adjusted. According to the ratio rule, the executor 50 monitors uplink packets (packets from the wireless network controller 26 to the packet gateway 30 for a given mobile station) for the time interval defined by the rate adaptation sensitivity parameter. The executor 50 calculates (at 127) two ratios of packets. The two ratios are the yellow ratio and the red ratio. The yellow ratio represents the number of uplink packets with ECN set to the yellow value (to indicate the yellow condition) to the total number of ingress packets that arrive on the tunnel between the wirelesses network controller 26 and the packet gateway 30. One tunnel is associated with each mobile station. The red ratio represents the number of packets with ECN set to the red value (to indicate the red condition) to the total number of ingress packets that arrive on the tunnel.

The executor 50 determines if either the yellow ratio or red ratio is greater than or equal to 0.5 (or some other predetermined percentage). If the yellow ratio is greater than or equal to 0.5, the rate adaptation control executor 50 sets (at 130) the shaping or scheduling rate to a value X, where X can be a function of the maximum bit rate and/or radio bearer priority. On the other hand, if the red ratio is greater than or equal to 0.5, then the rate adaptation executor 50 sets (at 130) the shaping or scheduling rate to a value Y, where Y is another function of the maximum bit rate and/or radio bearer priority. The Y value is lower than the X value to ensure that the scheduling rate is lower during periods of red condition than during periods of yellow condition.

The desired shaping/scheduling rates are communicated to the connection scheduler 56, which sets (at 130) the shaping rate accordingly. To further perform differentiation between different applications that are associated with different levels of quality of service (QoS), the connection scheduler 56 gives priority to the more important packets (that is, packets associated with applications or flows that have higher priorities or quality of service). Where there is contention between packets of applications or flows with different priorities or QoS for a given mobile station, the packet gateway 30 selects packets for the higher priority applications or flows for communication to the wireless network controller 26.

In effect, the connection scheduler 56 changes the shaping or scheduling rate dynamically based on congestion notification from an entity in the radio network 22. A benefit offered by the logic for changing the behavior of downlink communications between the packet gateway 30 and the wireless network controller 26 is that differentiation of packets associated with applications or flows of different priorities can be performed without the need for establishing secondary PDP (Packet Data Protocol) contexts, which can be time or resource consuming events due to the associated signaling required to establish such secondary PDP contexts.

Changing the shaping or scheduling rate refers to changing the rate at which the scheduler 56 (FIG. 1) services the queues 58 associated with a given tunnel or connection. The multiple queues 58 are associated with packets of applications or flows associated with different priorities, so that the scheduler 56, in response to notification of a congestion condition in a wireless network controller 26, is able to change the rate at which it services each of the tunnels. Note that the scheduler 56 is able to service the different queues at different rates or weights.

The executor 50 remains in the monitoring state 126 (where the executor 50 continues to calculate at 127 the yellow and red ratios based on counting packets at 129) as long as either the yellow ratio or red ratio remains between 0 and 0.5. However, the scheduling or shaping rate is set to the maximum value in this case. If both the yellow and red ratios are zero, the executor 50 transitions (at 128) back to the normal state 118. The executor 50 notifies the connection scheduler 56 of this and, in response, the scheduling rate is restored back to the maximum scheduling rate.

Based on the logic performed in 118-130, the packet gateway 30 sets (at 114) the ECN value in downlink packets according to the detected congestion level indicated by packets received from the wireless network controller. The packet gateway 30 sends (at 116) the downlink packets to the wireless network controller.

Figure 3:
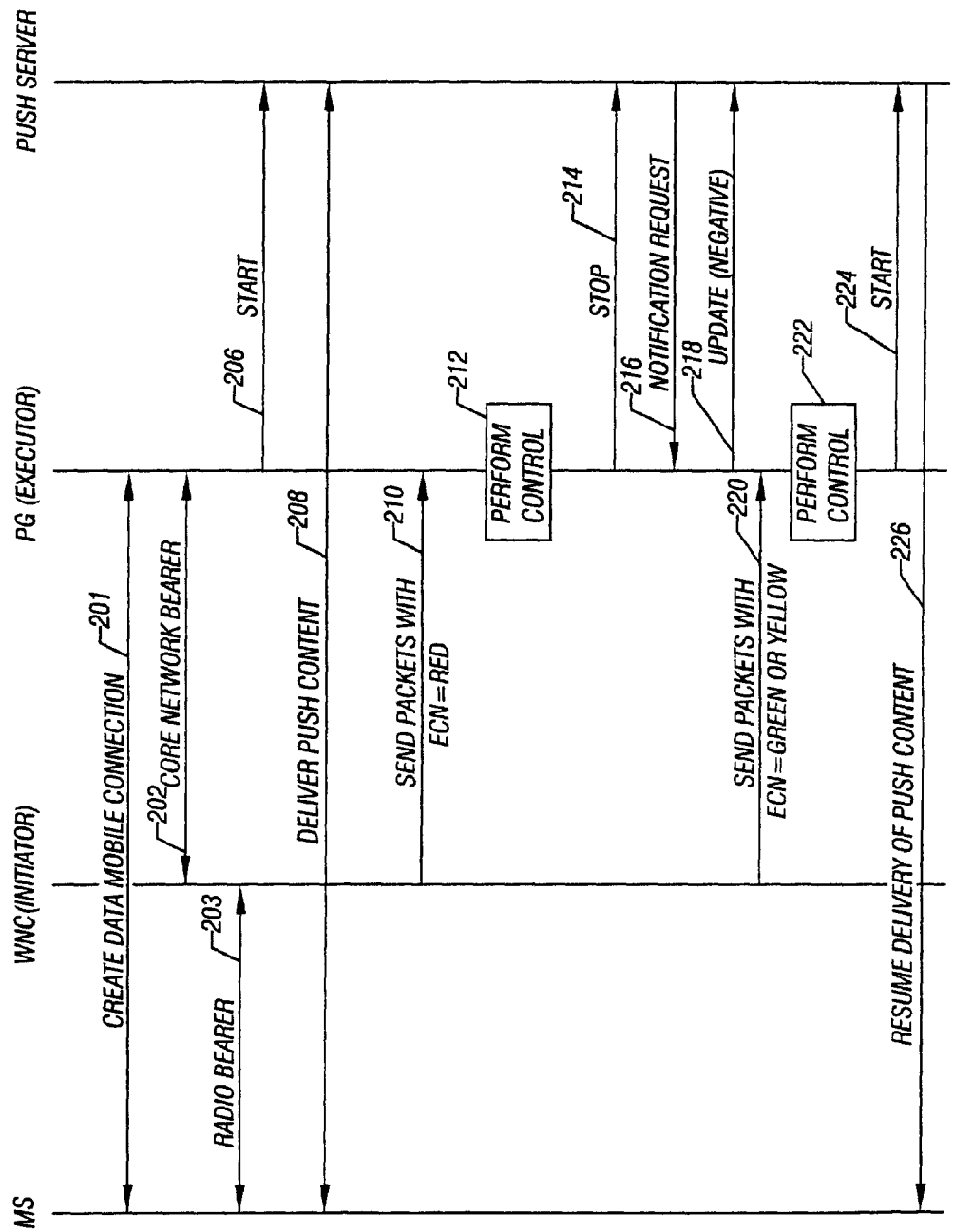
FIG. 3 is a message flow diagram of a process for handling push services based on load conditions in a radio network.

Referring to FIG. 3, a mechanism is described for delivering push content. Examples of push content include broadcast information to subscribers that are attached or connected to the radio network 22. Such broadcast information includes sales events, local news, service updates, and so forth. In some cases, there are two types of push content: "best effort" push content and "premium" push content. Best effort push content can be viewed as content that is not time sensitive, so delivery of such push content can be scheduled in such a way so as not to interfere with other usage of the radio network 22. The premium push content is content that the subscriber has requested and paid for. Such push content is time sensitive and has to be downloaded within a specific target time frame in order to be considered valuable information to a subscriber. Examples include stock news, location services, and so forth. In other embodiments, other types of push content may be present.

As shown in FIG. 3, a data mobile connection is created (at 202) between the mobile station 20 and packet gateway 30, and the rate adaptation control modules 38 and 50 are invoked. A core network path 202 and radio network path 203 are established. The rate adaptation control executor 50 in the packet gateway 30 determines whether or not the radio network 22 is heavily loaded. "Heavily loaded" refers to a condition of the radio network 22 that is the red condition (the most congested condition). This determination is based on packets sent (at 204) from the wireless network controller 26. If the rate adaptation control executor 50 determines that the radio network 22 is in either the green condition or yellow condition (ECN set to green or yellow value in packets), the rate adaptation control executor 50, sends an indication to the presence notification module 64 in the packet gateway 30, which in turn sends (at 206) a start message to the push server 18. This indicates to push server 18 that it can began to provide push content. In one embodiment, the start message is according to the RADIUS (Remote Authentication Dial In User Service) protocol, described in RFC 2138, dated April 1997. Other formats of the messaging between the packet gateway 30 and push server 18 can be used in other embodiments.

In response to the start message, the push server 18 delivers (at 208) push content to the mobile station 20. The wireless network controller continues to send packets to the packet gateway 30. If the rate adaptation control initiator 38 in the wireless network controller 26 detects that the radio network 22 is experiencing a heavy load condition, the wireless network controller 26 sends (at 210) packets with ECN set to indicate a red condition. Upon receipt of such packets, the rate control adaptation executor 50 in the packet gateway 30 performs control actions (at 212) to handle the indication of red condition. The executor 50 transitions through the same control states (normal state, waiting state, and monitoring state) as those discussed in connection with FIG. 2. Namely, the executor 50 transitions between the normal state and waiting state in response to detection of two consecutive packets with ECN set to indicate a red condition. The executor 50 then waits a predetermined interval of time in the waiting state. In the waiting state, the executor 50 counts the number of ingress packets and packets with ECN set to the red value. After expiration of the predetermined interval, the executor 50 transitions to the monitoring state, where the executor 50 calculates the ratio of packets with ECN set to indicate the red condition to the total number of ingress packets received from the wireless network controller over a given tunnel. If the ratio of red packets is greater than some predefined percentage, such as 0.5, the executor 50 sends an indication to the push notification module 64 of the heavily loaded condition, which causes the push notification executor to send a stop message (at 214) to the push server 18. In response to the stop message, the push server 18 stops delivering push content. In one embodiment, the push content that is stopped includes best effort push content. Premium push content continues to be delivered.

In some cases, the push server 18 may send a notification request (at 216) to determine if the push server 18 can resume the communication of push content. If the radio network 22 conditions have not changed (that is, the radio network 22 is still in the red condition) the packet gateway 30 responds (at 218) with an update message that indicates a negative response to the notification request.

Once the wireless network controller 26 detects that the radio network 22 is no longer in the red condition, the wireless network controller 26 sends (at 220) packets with ECN set to indicate either green or yellow. The executor 50, in response, performs (at 222) a control action, which includes transitioning from the monitoring state to the normal state. The executor 50 sends an indication to the push notification module 64 that the radio network 22 is no longer in the red condition, which causes the push notification module 64 to send (at 224) a start message to the push server 18. In response to the start message, the push server again resumes delivery (at 226) of push content.

In connection with FIGS. 2 and 3 above, packet data flow between the wireless network controller 26 and packet gateway 30 has been adjusted in response to the detected load condition of the radio network 22. In another case, the change in communication between the wireless network controller 26 and packet gateway 30 can be performed in response to a load condition of the packet gateway 30 resources. Note that the packet gateway 30 serves multiple wireless network controllers. If the packet gateway 30 experiences some type of a fault, it may lose connections with all its associated wireless network controllers. In such a case, when the packet gateway resumes normal operation, the many wireless network controllers may all issue requests to re-establish call connections that were dropped due to a fault experienced at the packet gateway 30. Usually, the packet gateway 30 is limited in how many requests it can handle within a certain time period.

If too many requests are received by the packet gateway 30 at one time, the packet gateway 30 may not be able to adequately service the requests. In addition to fault conditions of the packet gateway 30, there may be other events that may cause a sudden spike in the number of requests received by the packet gateway 30.

Figure 4:
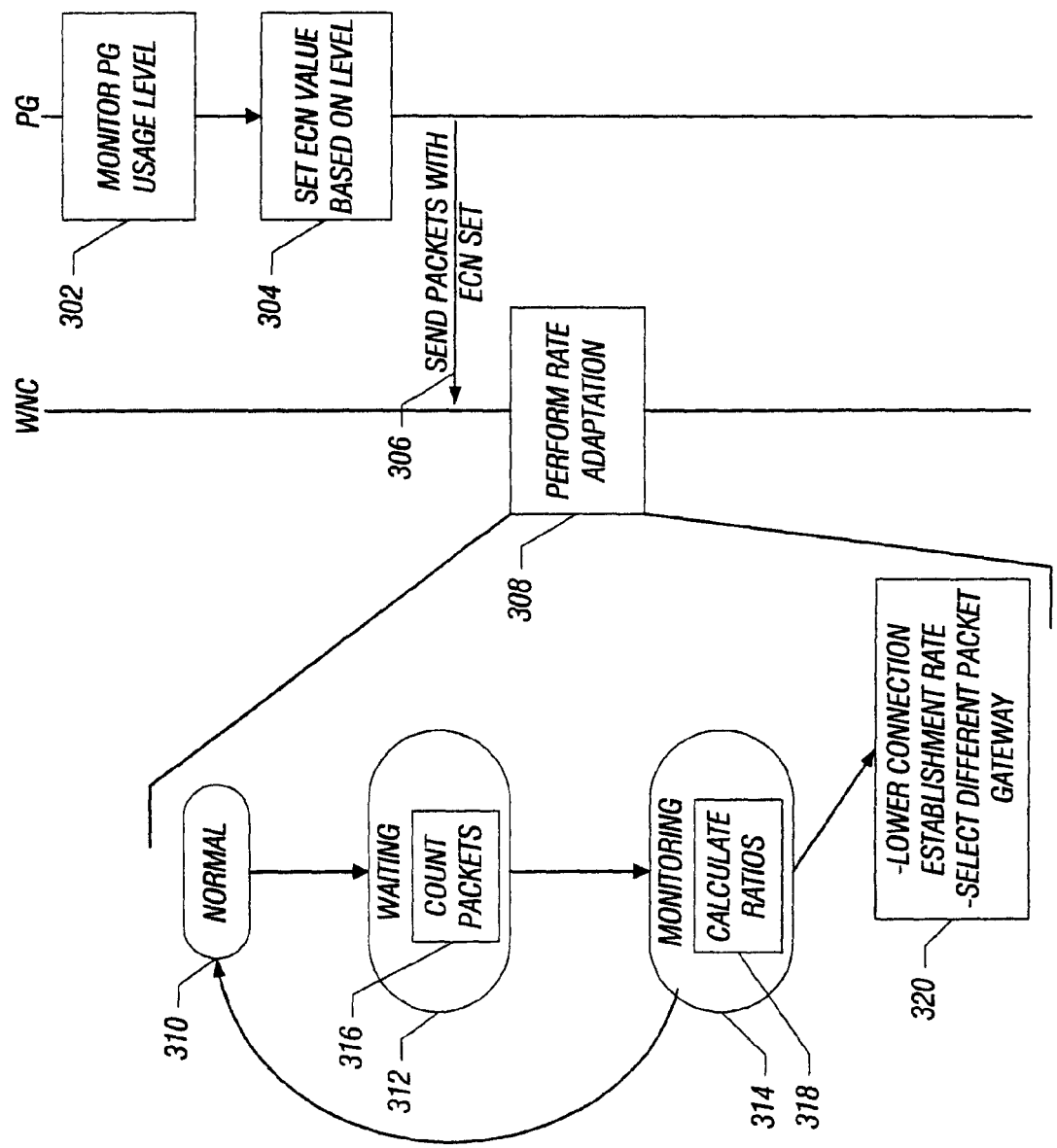
FIG. 4 is a message flow diagram of a process for handling data call setup in response to load conditions of a packet gateway.

Referring to FIG. 4, a procedure is described to handle congestion of network resources of the packet gateway 30. The overload control module 62 (FIG. 1) monitors (at 302) the resource level usage of the packet gateway 30. This packet gateway resource level is communicated in an indication sent from the overload control module 62 to the rate adaptation control module 50 in the packet gateway 30. In the application of FIG. 4, the rate adaptation control module 50 is the rate adaptation control initiator, while the rate adaptation control module 38 in the wireless network controller 26 is the executor.

Based on the monitored packet gateway resource level, the initiator 50 sets (at 304) the ECN value for indicating the detected level. The packet gateway 30 sends (at 306) packets to the wireless network controller with ECN set. If the packet gateway is experiencing a moderate or heavy congestion condition, the ECN is set to indicate a yellow or red condition. Otherwise, the ECN is set to indicate a green condition. In the CDMA context, the ECN indication is communicated to the PCF module in the wireless network controller 26.

Based on the ECN value received in the packets, the rate adaptation control executor 38 in the wireless network controller 26 performs (at 308) rate adaptation. This includes transitioning between states of a state machine that has a normal state 310, a waiting state 312, and a monitoring state 314. The executor 38 starts in the normal state 310, and transitions from the normal state to the waiting state 312 in response to receiving a predetermined number of consecutive packets with the ECN set to indicate either the yellow condition or the red condition. The executor 38 stays in the waiting state 312 for a predetermined period of time, such as a time set by the rate adaptation sensitivity parameter shown in Table 1 above. In the waiting state, the executor 38 counts the number of packets (at 316), including the total number of ingress packets (from the packet gateway 30), the number of packets with ECN set to indicate the red condition, and the number of packets with ECN set to indicate the yellow condition.

After expiration of the time period, the executor 38 transitions from the waiting state 312 to the monitoring state 314. As in the case with FIG. 2, the executor 38 calculates (at 318) the yellow ratio and red ratio for a given tunnel. If the yellow ratio is greater than or equal to some predefined percentage, such as 0.5, the executor 38 informs the signaling state machine 46 (FIG. 1) to reduce the effective connection establishment rate. For example, if the wireless network controller can establish up to X calls per second (under normal conditions), the rate control adaptation executor 38 informs the signaling state machine 46 in the wireless network controller 26 to reduce (at 320) the effective connection establishment rate to a lower value. If the red ratio is greater than or equal to 0.5, the rate control adaptation executor 38 informs the signaling state machine to select (at 320) a backup packet gateway for subsequent mobile station data call setups. The backup packet gateway is selected by the packet gateway selection module 48. Since a backup packet gateway has been selected, the effective connection establishment rate can be set to the maximum speed by the wireless network controller 26.

If both the yellow and red ratios are between 0 and 0.5, the effective connection establishment rate and packet gateway selection remains unchanged, and the rate control adaptation executor 50 stays in the monitoring state 314 (where the executor 50 continues to re-calculate the yellow and red ratios based on incoming packets). If both the yellow and red ratios are zero, then the effective connection establishment rate is set back to the maximum level permitted by the wireless network controller 26 and the packet gateway selection algorithm selects the primary packet gateway. The rate control adaptation executor 38 transitions back to the normal state 310.

A benefit offered by using ECN to notify the wireless network controller 26 of congestion conditions in the packet gateway 30 is that new signaling to perform such notification does not need to be defined. Also, the packet gateway 30 does not need to reject calls due to an overloaded condition of the packet gateway 30. Instead, the packet gateway 30 sends an indication of the congestion (via ECN), so that the wireless network controller 26 can either slow down or select another packet gateway for establishing new calls or communications sessions.

Instructions of the various software routines or modules discussed herein (such as the entities in the wireless network controller 26 and the packet gateway 30) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of managing wireless communications, comprising:
   establishing a communication session between a mobile station connected to a first network having a wireless network controller and a server connected to a second network, and exchanging bearer traffic between said mobile station and said server in said established communication session;
   communicating, between said wireless network controller and a first packet gateway, a first indication of congestion of network resources other than at said mobile station and said server in a packet communicated as part of the communications session;
   adjusting the communication of data between the wireless network controller and the first packet gateway based on the communicated first indication by selecting a second packet gateway for establishment of communications sessions;
   communicating a second indication that no or light congestion of network resources is present; and
   in response to the second indication, the first packet gateway communicating a start request to said server to send data from the server to said mobile station in the wireless network.

2. The method of claim 1, further comprising, in response to the first indication, the first packet gateway communicating a stop request to the server to stop sending data from the server to the mobile station.

3. The method of claim 2, further comprising the first packet gateway communicating push content from the server to the mobile station.

4. The method of claim 1, wherein communicating the first indication comprises the first packet gateway sending the first indication to the wireless network controller to indicate congestion of network resources of the first packet gateway.

5. The method of claim 1, wherein communicating the first indication comprises receiving the first indication at the wireless network controller to indicate congestion of network resources of the first packet gateway.

6. The method of claim 1, wherein communicating the first indication in the packet comprises communicating the first indication in a packet containing one of bearer data and control information.

7. The method of claim 1, wherein communicating the first indication in the packet comprises communicating the first indication in a header of the packet.

8. The method of claim 1, further comprising the wireless network controller monitoring a load condition of a wireless network, wherein communicating the first indication comprises the wireless network controller sending the first indication to the first packet gateway in response to the wireless network controller detecting that the load condition in the wireless network exceeds a predetermined level.

9. The method of claim 8, wherein sending the first indication comprises sending an explicit congestion notification in one or more packets.

10. The method of claim 9, wherein sending the explicit congestion notification in the one or more packets comprises sending the explicit congestion notification in one or more Internet Protocol (IP) packets.

11. The method of claim 8, wherein adjusting the communication of data comprises the first packet gateway changing a scheduling rate of data to be communicated from the first packet gateway to the wireless network controller in response to the first indication.

12. The method of claim 11, wherein changing the scheduling rate comprises changing a rate at which a scheduler in the first packet gateway schedules data in one or more queues.

13. The method of claim 1, wherein said communications session is established with a Quality of Service (QoS) level, and said adjusting step comprises adjusting communication of data without changing said QoS assigned to said communications session.

14. The method of claim 1, wherein said adjusting step is initiated in response to one of said wireless network controller and first packet gateway detecting said first indication of congestion.

15. An article comprising at least one computer readable non-transitory storage medium containing instructions that when executed cause a server outside of a wireless communications network to:
communicate data packets associated with packet-switched communications of bearer traffic between the server and a mobile station in said wireless communications network as part of an established communications session between said server and said mobile station;
receive a first indication of congestion of wireless network resources other than said mobile station, included in at least one of the packets from the mobile station;
in response to receiving the first indication of congestion, adjust communication of data from the server to the mobile station by selecting a secondary packet gateway different from a primary packet gateway for establishment of communications sessions;
receive a second indication that no or light congestion of network resources is present; and
in response to the second indication, transmit data to the mobile station.

16. The article of claim 15, wherein the first indication is contained in a header of the at least one of the packets.

17. The article of claim 15, wherein the instructions when executed cause the server to adjust communication of data by changing a scheduling rate of data communicated to the mobile station.

18. The article of claim 17, wherein the instructions when executed cause the server to change the scheduling rate of data by changing a rate at which data in one or more queues is processed by a scheduler.

19. The article of claim 15, wherein the instructions when executed cause the server to adjust communication of data by stopping transmission of certain content to said mobile station.

20. The article of claim 19, wherein the certain content comprises push content.

21. The article of claim 15, wherein the instructions when executed cause the server to adjust the communication of data by reducing an effective call setup rate.

22. The article of claim 15, wherein said communications session is established with a Quality of Service (QoS) level, and said adjusting step comprises adjusting communication of data without changing said QoS assigned to said communications session.

23. The article of claim 15, wherein said adjusting step is initiated in response to detection of said first indication at a location other than said server.

24. An apparatus capable of communications over a wireless communications network, comprising:
an interface to a core network in the wireless communications network; and
a controller for:
communicating data packets associated with packet-switched communications of bearer traffic to a mobile station coupled to the core network as part of an established communications session,
receiving a first indication of congestion of network resources, included in at least one of the packets from said mobile station,
adjusting packet data flow with the entity in response to the first indication by selecting a secondary packet gateway different from a primary packet gateway,
receiving a second indication that no or light congestion of network resources is present, and
in response to the second indication, transmitting a start request to a server to send data to the mobile station.

25. The apparatus of claim 24, further comprising one of a code-division multiple access (CDMA) packet data serving node (PDSN) and a Universal Mobile Telecommunication System gateway General Packet Radio Service serving node (GGSN).

26. The apparatus of claim 24, further comprising a wireless network controller.

27. The apparatus of claim 26, wherein the wireless network controller comprises one of a base station controller (BSC) and a radio network controller (RNC).

28. The apparatus of claim 24, wherein the controller is adapted to adjust the packet data flow by changing a scheduling rate of a scheduler.

29. The apparatus of claim 24, wherein the server comprises a push content server, and the controller is adapted to adjust the packet data flow by sending a notification to the push content server to stop transmitting certain data.

30. The apparatus of claim 24, wherein the controller is adapted to adjust the packet data flow by reducing an effective call setup rate.

31. The apparatus of claim 24, wherein said communications session is established with a Quality of Service (QoS) level, and said adjusting is done without changing said QoS assigned to said communications session.

32. The apparatus of claim 24, wherein said communications session involves communication of said data packets between said mobile station and said server, and said controller is separate from each of said mobile station and said server.

33. The apparatus of claim 24, wherein said congestion of network resources is congestion of resources other than at said mobile station.

* * * * *